Feb. 2, 1965   F. HOLPER   3,168,665
MULTIPLE ROTOR INDUCTION MOTOR UNIT
Filed Jan. 2, 1962   2 Sheets-Sheet 1
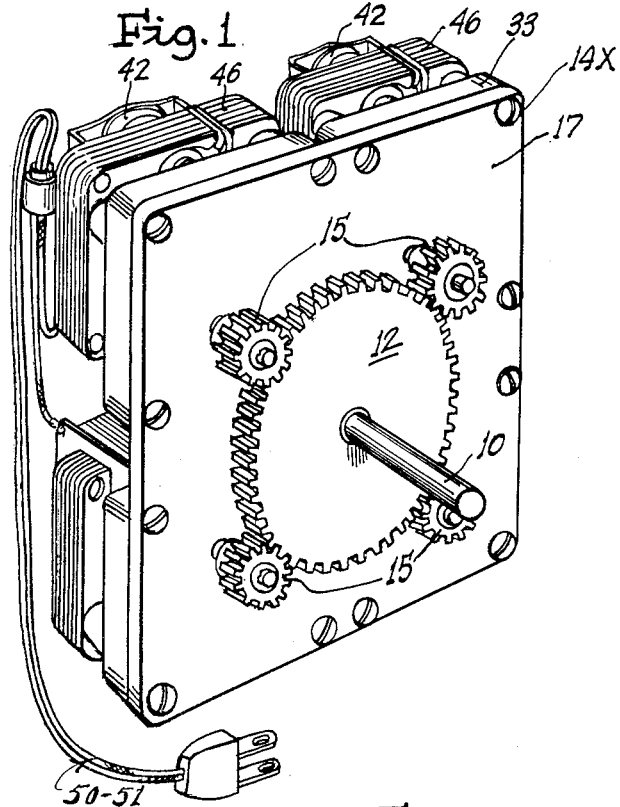
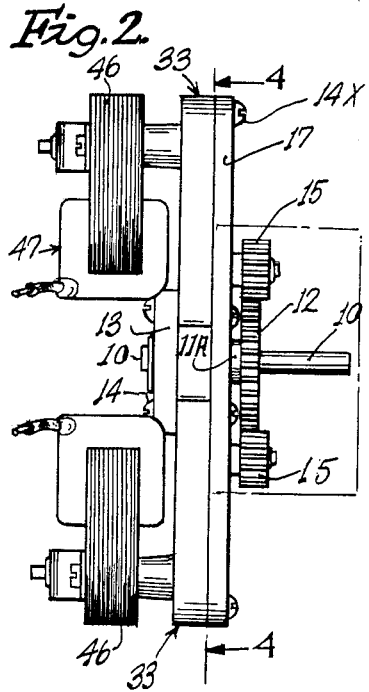
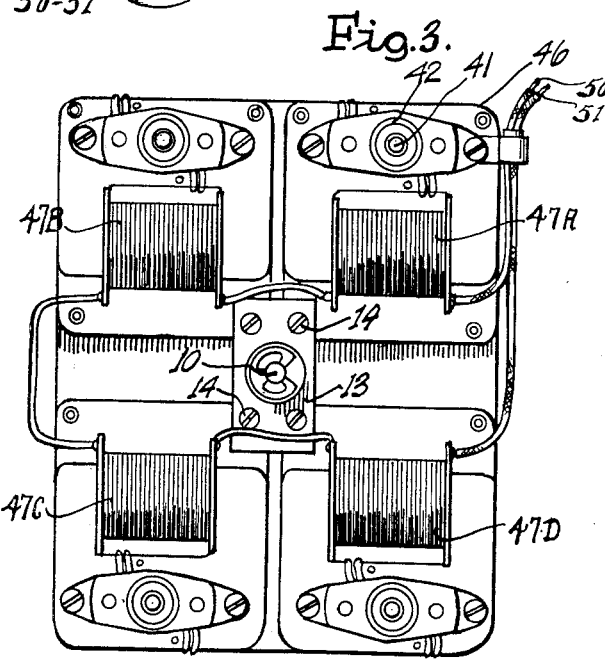
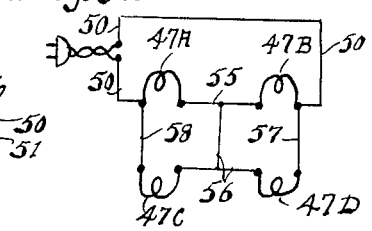
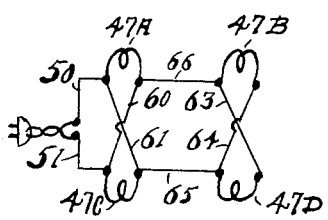
INVENTOR.
FRANK HOLPER
BY
ATTORNEY.

Feb. 2, 1965 F. HOLPER 3,168,665
MULTIPLE ROTOR INDUCTION MOTOR UNIT
Filed Jan. 2, 1962 2 Sheets-Sheet 2

INVENTOR.
FRANK HOLPER
BY
ATTORNEY.

United States Patent Office 3,168,665
Patented Feb. 2, 1965

3,168,665
MULTIPLE ROTOR INDUCTION MOTOR UNIT
Frank Holper, Palatine, Ill., assignor to Molon Motor & Coil Corp., Rolling Meadows, Ill., a corporation of Illinois
Filed Jan. 2, 1962, Ser. No. 163,815
4 Claims. (Cl. 310—112)

This invention pertains to electric motors of the fractional horsepower variety and is particularly useful in conjunction with small, self-starting squirrel-cage types of induction motor which develop relatively low starting torques, it being the principal object of the improvements to provide a compact power unit of economical but reliable character utilizing a plurality of small motors of this class in a concentrically ganged assembly, and each motor being provided with individual, automatic inductive clutching and its own reduction gear system driving a common output gear for the unit in a manner providing a good starting torque and exceptionally high working torque, all at a cost and minimized size and power consumption which affords a practical substitute for higher-priced single rotor units capable of comparable performance.

A further object is to provide a highly compact, multi-rotor, automatic clutching power unit employing an inductive rotor clutch and having a much higher torque rating than has been possible heretofore in single-rotor motors of the class described using such clutches.

A further object is the provision of a multi-rotor motor power unit having a relatively flatter shape than is possible with a single rotor motor of comparable output power rating.

Still another object is the provision of an induction motor having multiple rotors and winding and a gear system which makes possible connection of the windings in a fail-safe arrangement for use in critical applications in which failure of the motor due to burn-out can have serious consequences.

Additional aspects of novelty and utility relate to details of the construction and operation of the embodiment described hereinafter in view of the annexed drawings, in which:

FIG. 1 is a front perspective view of the complete motor unit;

FIG. 2 is a side elevation of the same;

FIG. 3 is a rear elevation showing the multiple motor symmetry relative to the main drive or output shaft;

Figure 4:
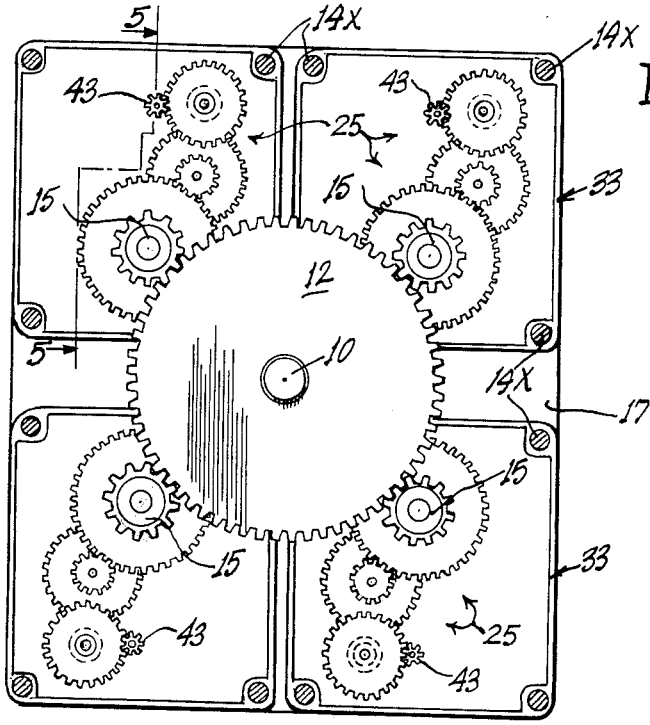
Figure 5:
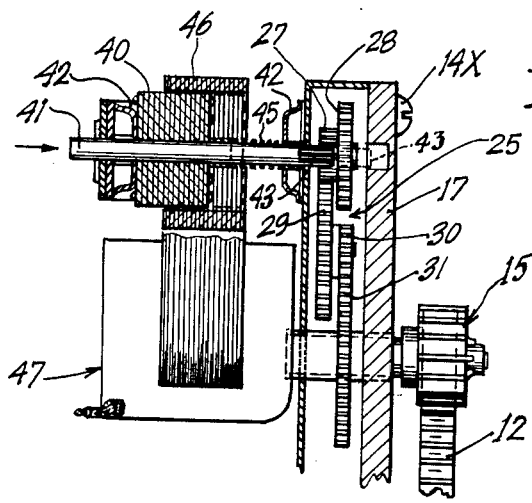

FIG. 3-A is a wiring diagram showing a series-parallel fail-safe connection of the field or stator coils;

FIG. 3-B is another wiring diagram showing a parallel fail-safe connection for the stator coils;

FIG. 4 is a front view of the unit with cover plate removed showing the main output gear and individual reduction gear units;

FIG. 5 is a fragmentary sectional detail taken along lines 5—5 of FIG. 4 showing the automatic inductive clutch means for one of the motor units;

Referring to FIG. 1 the motor unit comprises a central output shaft 10 having a large driven gear 12 fast thereon and adapted to be driven by any or all of four driving or power pinions 15 situated equidistantly about the periphery of the driven gear and therefore concentrically of the output shaft 10.

As viewed in FIG. 2, the output shaft 10 is journalled in the main mounting plate 11 as at 11-A and also in a bearing block 13 (FIG. 3) secured by screw means 14 tapped into plate 11 through mounting holes in the adjoining corners of the individual motor gear housings 33, whereby, as in FIG. 3, each motor unit is in part attached in the assembly to the plate 17, other corner screws 14X (FIGS. 1, 2, and 4) being utilized to further secure the several motor units at the four corners of said plate.

Each of the four motor units is a complete, automatically-clutching power plant capable of fail-safe operations independently of the others by automatic action, or otherwise in accordance with the several circuit arrangements to be described, a single motor unit being depicted in section in FIG. 5, wherein it will be seen to comprise a reduction gear system generally indicated at 25 and consisting of a set of reduction gears 27, 28, 29, 30, 31 (see also FIG. 4) which are respectively journalled within an appertaining one of the individual gear housings 33.

The motors depicted are of the shaded-pole, fractional horsepower induction type with magnetic field-load clutching, each motor (FIG. 5) having a rotor 40 on a shaft 41 journalled in bearings 42, the shaft having a small driving and clutching pinion 43 formed in an end thereof and normally withdrawn from driving engagement with the first reduction gear 28 by action of a spring 45 carried on the rotor shaft, which acts to shift the shaft and its armature 40 axially outwardly of the field or stator frame 46 toward the left (FIG. 5) until such time as power is applied to the field winding 47, which will cause the rotor to pull into the field (to the right and the dotted-line position shown in FIG. 5) and engage the clutch pinion 43, which will also begin to rotate as it moves axially, with the gear 28, and through the associated reduction gears drive the main output gear.

It will be apparent that mere application of power to any one or more of the motor windings will under normal conditions result in application of torque to the main output shaft 10. The application of power to the several motor windings will be in accordance with one of the circuit arrangements alluded to hereafter, to energize the same individually, or jointly in series or parallel or series-parallel connection, depending upon the character of the load and margin for failure indicated.

The gear ratios in each individual gear system will normally be in reduction ratios and identical, particularly where joint rotor operation is intended in the parallel and series circuits. However, since the motor fields are of the split-phase or shaded-pole variety and self-starting, it is possible for any motor to run at any speed and employ different gear ratios.

In FIG. 3 the four motor windings are connected for series operation from a power cord, adapted to be connected directly to the usual 117 volt, A.C. service line, in which one conductor 50 connects with one terminal of the winding 47A of the first motor, the remaining terminal of which connects via another jumper 52 to one terminal of the second motor winding 47B, which in turn connects via a jumper 53 to the third winding 47C, with jumper 54 completing the series connection to the fourth winding 47D, the remaining terminal of which connects to the remaining power cord conductor 51. Such a series connection may be desirable in many applications requiring total maximum torque for least cost of the windings, which may employ ordinary insulation and carry a fairly heavy current load with safe heat dissipation and temperature rise across each individual winding.

For some application, however, the series winding may be undesirable for the reason that failure of the winding of any one motor will cut all remaining motors out of service and the unit as a whole fails.

Where a fail-safe operation is required ,the multiple motor windings may be connected for series-parallel or parallel operation in accordance with the wiring of FIGS. 3–A and 3–B respectively.

In FIG. 3–A one of each of the power conductors 50, 51 is connected to one terminal of one of the two windings 47A, 47B, the respective remaining terminals of which are connected in series by jumper 55, while the remaining two windings 47B, 47D, are connected in series by a jumper 56, and their respective remaining terminals are each connected by jumpers 57 and 58 with one of the power conductors 50, 51, so that there are two sets of two windings in series, and each such set is shunted across the power line. In this system, either one or both windings could fail in any one set, and if any one fails, its series-connected companion will continue to function in a circuit which is still of series-parallel character, and continues capable of substantial total output torque. It is also of interest in this connection to observe that one motor in each set can fail simultaneously and leave two motors running in series.

For the maximum in fail-safe operation, the full parallel connection of the windings shown in FIG. 3–B will permit failure of any three out of the four windings without total loss of useful torque. In this circuit windings 47A and 47C have their terminals interconnected by cross-over jumpers 60 and 61, while the remaining two windings 47B and 47D are similarly cross-connected by jumpers 63 and 64, and additional jumpers 65 and 66 respectively connect the cross-over jumpers 61, 64 and 60, 63; and the power conductors 50, 51 are respectively connected to the cross-over jumpers 60 and 61, it being noted however that the particular circuit configurations shown in FIGS. 3–A and 3–B are not limiting and any other connections for achieving parallel and series-parallel interconnections of the several motor windings may be utilized, it being understood that for each type of circuit, whether series, series-parallel or parallel, suitable windings will be provided with respect to the maximum load to be met by each motor, in multiple and reduced multiple resulting from failure of one of the group.

Electrical failure of any motor which deenergizes its winding will cause that motor in effect to drop out of the combination mechanically as well as electrically as a result of the automatic inductive character of the clutch means, as a result of which the dead loading effect of the corresponding train of reduction gears will be eliminated.

The concentric joinder of four rotors with their stators in a quadrantial array affords a power package capable of developing considerable maximum power in relation to both its total cubic displacement and relatively flat, rectangular shape in comparison with a conventional motor of comparable power in which the weight and bulk of the iron tends to grow into unwieldy form as well as mass with increasing complications in heat dissipation and electromagnetic efficiency.

The inductive clutching means disclosed is very desirable for many applications requiring low torque motors; however, it has not been feasible to use such clutches on motors having a "stack" over one inch thick, referring to the thickness of the stack of iron laminations comprising the stator frame 46, for the reason that the mass of a larger rotor and the inductive thrust imparted to it in entering the field becomes sufficiently violent and destructive to cause rapid deterioration of the teeth on the pinion and gear 43, 27, although these parts are normally made of a synthetic plastic of the class of nylon having good working life in stacks which do not exceed about one inch in thickness.

The disclosed power unit affords a working torque rating far in excess of that which could be safely attempted with a conventional single-rotor motor of like class in combination with the inductive rotor clutch means described, and this feature coupled with the other advantages such as compactness, flatness, selective field winding combinations and starting relief for small, individual rotors working a relatively heavy common load, provides an economical, versatile, power package of great utility.

I claim:

1. A motor power unit comprising, in cooperative combination: a main output gear; a plurality of intermediate gear systems each including an output gear drivingly meshing with said main output gear, electric motor means of the inductive, squirrel-cage, shaded-pole type including a plurality of rotors, stator means and an energizing winding for each said rotor; a driving pinion rotated by each rotor, each said pinion being shiftable into and out of driving engagement with a corresponding gear means constituting a part of a corresponding one of the aforesaid intermediate gear systems; together with electromagnetically-actuated means including the appertaining rotor actuated in a linear displacement responsive to energization and deenergization of the appertaining stator means for moving a corresponding one of said pinions into and out of driving cooperation with the corresponding intermediate gear means substantially in synchrony with the exertion and cessation of electromagnetic force on the appertaining rotor resulting from energization and deenergization of the appertaining stator means as aforesaid by the corresponding winding; and an operating circuit connecting said windings in a predetermined electrical configuration from a common source of supply for energization simultaneously.

2. An electric motor unit comprising a base-plate having a main output gear journalled centrally thereon; a plurality of independently operable reduction gear units mounted on the side of said plate opposite from said gear and in positions about and radial to the axis of the gear, each said gear unit having an output pinion drivingly meshing with said main output gear; a fractional horsepower shaded-pole self-starting squirrel-cage type induction motor for each reduction gear means, and each motor including its own energizing winding and an axially shiftable rotor-and-shaft clutch means including a clutch pinion movable by the shaft into driving coaction with the appertaining reduction gear means on energization of the corresponding motor winding and withdrawn by spring means from said driving coaction on deenergization of said winding; and an operating circuit including all said windings connected for energization simultaneously from one common power source.

3. A high-torque electric motor unit utilizing fractional horsepower self-starting squirrel cage type induction motor units in multiples, and comprising a main output gear and shaft centrally journalled on one face of a base plate; four fractional horsepower electric motors of the shaded-pole squirrel-cage type each having its own winding and an operatively conjoined reduction gear unit and automatic induction clutch means including an axially shiftable shaft and rotor spring-loaded to dispose the rotor normally partially out of the motor field to be inductively pulled into running position in the field on energization of the latter; together with a clutch pinion on said shaft drivingly engaged with the appertaining reduction gear unit when the corresponding rotor is pulled into the field, each said reduction unit having an output pinion drivingly engaging said main output gear, and capable of being idly driven with said main output gear when the appertaining clutch pinion is disengaged, whereby failure of any appertaining motor unit or clutch means will not unduly load or jam operation of the remaining motor units; and a fail-safe operating circuit connected with said windings for energization of at least some of the same in parallel.

4. In an electric motor device of the type employing a main output drive shaft driven by a plurality of motors mounted in a unitary assembly with said output shaft, improvement comprising: a mounting plate having a main output shaft supported thereby in an approximately central location to project from a certain side thereof; a plurality of separate trains of reduction gears and housing means therefor each mounted on a side of said plate opposite from said certain side and in substantially symmetrically spaced relationship about said main output shaft with the rotative axes of the several gears of the respective gear trains thereof in parallelism with said main shaft; said main shaft being provided with a driven gear fast thereon, on said certain side of the plate, each gear train having an output shaft extending through said plate to said certain side thereof and provided thereat with a corresponding output gear drivingly engaging with said main output gear; an electric motor for each said gear train, each motor being of the shaded-pole-self-starting squirrel-cage type, each having a stator with individual field winding and supportably engaged with one of said gear-train housings, each motor also having a rotor carried on an axially shiftable shaft provided with a clutch-drive pinion normally retracted by spring action on said rotor shaft from driving engagement with the appertaining gear train and shiftable into driving engagement with said train in response to energization of the appertaining field winding and axial displacement of the appertaining rotor; circuit means interconnecting said windings for simultaneous energization from a single power source; and bearing means for said main output shaft mounted at the side of said stator which is most remote from said housings to complete a two-point support with said main mounting plate for said main output shaft.

References Cited by the Examiner
UNITED STATES PATENTS

| | | | |
|---|---|---|---|
| 722,916 | 3/03 | Scott | 310—112 |
| 1,292,592 | 1/19 | Ferris | 310—112 |
| 1,292,621 | 1/19 | McCloskey | 310—112 |
| 1,865,980 | 7/32 | Thau | 318—45 |
| 2,463,349 | 3/49 | Baner | 310—112 |
| 2,869,008 | 1/59 | Carlsen | 310—209 |

MILTON O. HIRSHFIELD, *Primary Examiner.*